July 25, 1950     L. E. STELLY     2,516,658
SEA FOOD TRAP
Filed Nov. 19, 1945     2 Sheets-Sheet 1
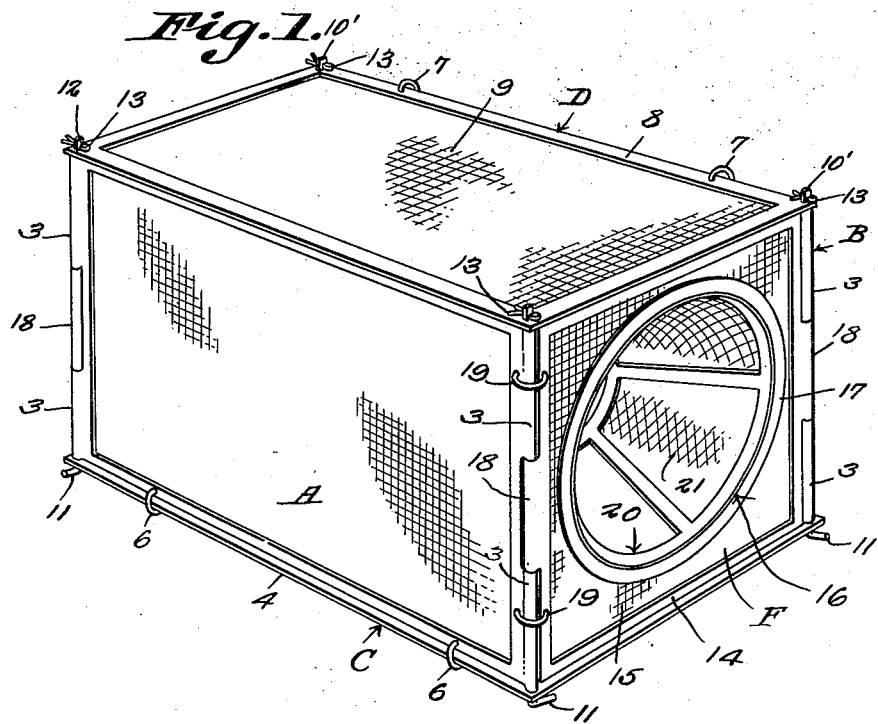
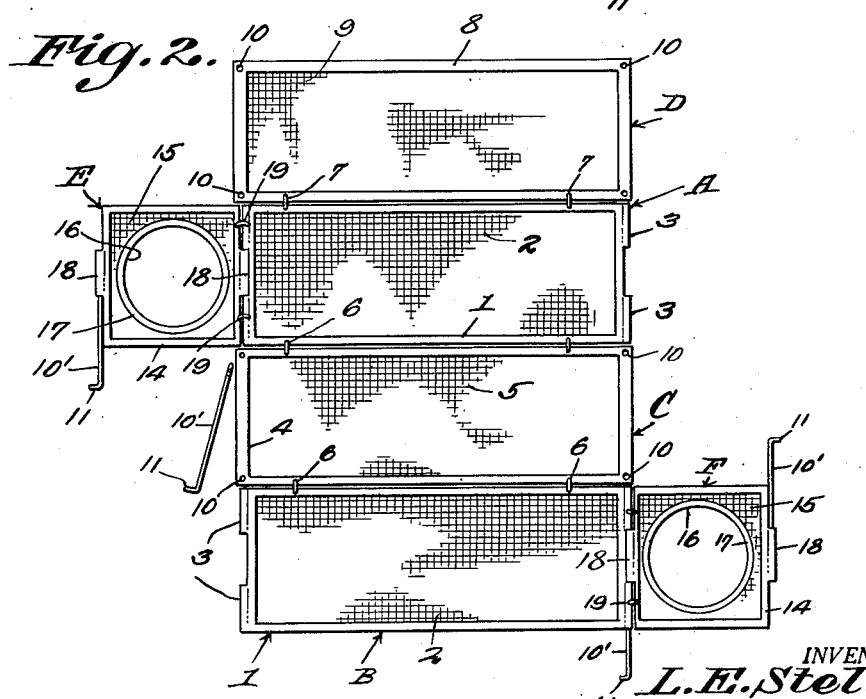
INVENTOR.
L. E. Stelly July 25, 1950 — L. E. STELLY — 2,516,658
SEA FOOD TRAP Filed Nov. 19, 1945 — 2 Sheets-Sheet 2

L. E. Stelly
INVENTOR.

BY
ATTORNEYS.

Patented July 25, 1950

2,516,658

UNITED STATES PATENT OFFICE 2,516,658

SEA FOOD TRAP

Louis E. Stelly, Opelousas, La.

Application November 19, 1945, Serial No. 629,505

1 Claim. (Cl. 43—100)

This invention relates to a sea food trap designed for catching fish of different kinds, shrimp, crab, etc., it being understood that it is possible to modify the construction of the trap to adapt it to the kind of sea food to be caught, these modifications being within the scope of the appended claim.

It is a further object of the invention to provide a trap of this character formed entirely of metal and which is made up of parts so connected that they can be shipped in a knock-down condition, occupying a small space, but can be readily set up for use so as to form a complete trap having conical intakes, and a movable closure.

It is a further object to provide a trap which can be made at low cost, and will withstand rough handling.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings, the preferred form of the invention has been shown.

In said drawings,

Figure 1 is a perspective view of the trap set up for use.

Figure 2 is a plan view showing the panels of the trap unfolded.

Figure 3:
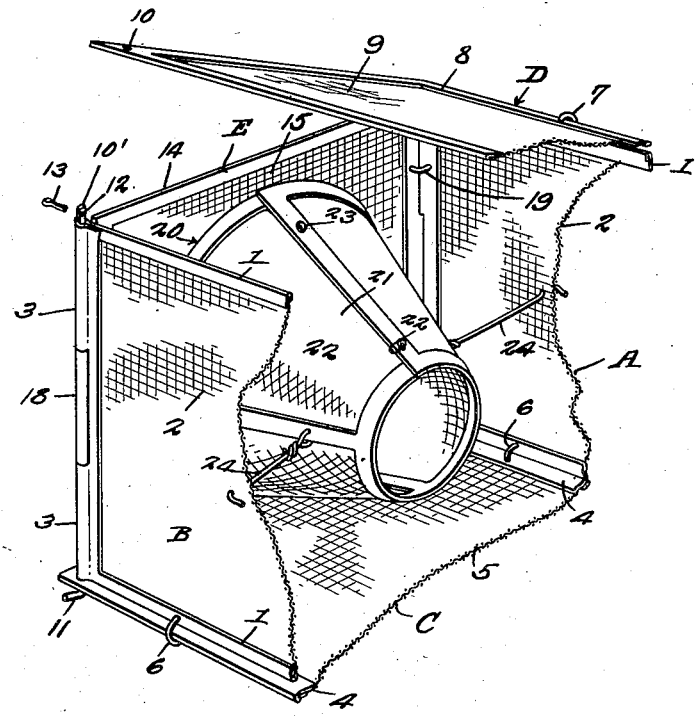
Figure 3 is a perspective view of a portion of one end of the trap viewed from the interior, the top panel of the trap being shown partly open.

Referring to the figures by characters of reference, A and B constitute side panels each of which consist of a rectangular frame 1 formed of sheet metal clinched or otherwise assembled with a sheet of wire fabric 2 which can also be joined to the frame by soldering or welding at any point desired, as will be obvious. Each end of each of the panels A and B has its frame bent to provide aligned spaced sleeves 3 preferably arranged in pairs.

Interposed between the panels A and B is another panel C constituting the bottom of the trap and which is also formed of a frame 4 preferably of sheet metal to which is secured in any suitable manner a panel 5 of wire mesh. The panels A and B are of the same length as panel C and are joined by stiff wire rings 6 constituting hinged connections between the panels. Another panel D is joined to panel A by rings 7 and is of the same size as panel C, it being formed of a sheet metal frame 8 surrounding a wire mesh panel 9.

Formed in the corner portions of the frames 4 and 8 are openings 10 and these openings are so located that when the panels C and D are at right angles to the panels A and B, the openings 9 will align with the sleeves 3 on the panels A and B. Thus coupling rods 10' can be inserted through the openings and the sleeves aligned therewith for the purpose of holding these panels at desired angles to each other. Each rod 10' can be provided with an offset end 11 to limit its movement in one direction while the other end of each rod can be provided with an opening 12 for the reception of a cotter pin 13 or the like. This is shown clearly in Figures 1 and 3.

End panels E and F are provided, each panel being so proportioned that when it is disposed at right angles to the other panels, it will substantially close the space between said panels. Each panel E and F includes a frame 14 preferably of sheet metal extending around and suitably joined to a wire mesh panel 15 having a central opening 16 surrounded by a metal ring 17 joined in any suitable manner to the wire mesh for the purpose of reinforcing it.

The frame of each panel E and F has oppositely extending sleeves 18 so proportioned that when the panels E and F are positioned between the ends of the other panels, these sleeves 18 will fit between the sleeves 3 so that the rods 10', when inserted into the sleeves 3, can also be extended through the sleeves 18, thus securely but detachably fastening the panels E and F to the side panels A and B.

For the purpose of holding the panels E and F hingedly joined to the panels A and B respectively after the coupling rods 10' have been removed, supplemental hinge members in the form of rings 19 can be located in the frames of said panels as shown in Figure 2.

Figure 4:
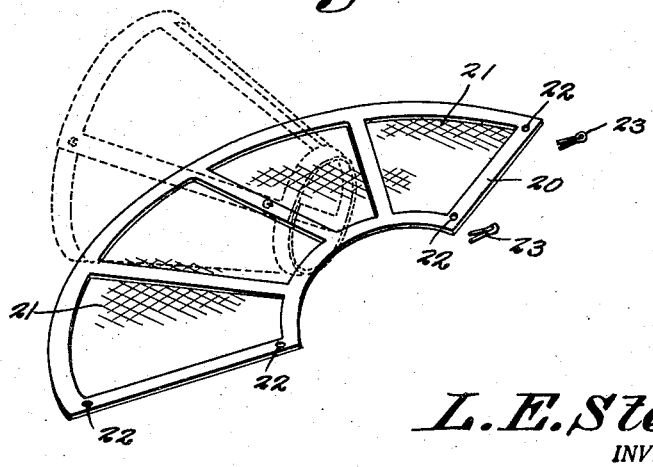
Figure 4 is a perspective view showing, in full lines, one of the cones in its initial or flat form, said cone being shown by broken lines after it has been bent into conical form.

The cones forming a part of the trap are of special construction as shown in Figure 4. Each cone comprises a segmental open frame 20 formed preferably of sheet metal, the openings in this frame being closed by means of segmental panels 21 of wire mesh. Apertures 22 are provided in the ends of the frame and, by reason of the peculiar configuration of the frame, it is possible to bend said frame into frusto-conical form so as to bring the apertures 22 at the two ends into register, thereby permitting the insertion of cotter pins 23 or the like for the purpose of holding the bent cone or inlet member in proper form. When this inlet member is thus shaped, the large end thereof will be of such size as to surround the opening 16 in one of the end panels E or F and the inlet member formed by the cone can be held in this position by any suitable means. For example, hooks 24 can be connected to opposed portions of the inlet member and pressed into engagement with opposed panels A and B, as shown in Figure 3, thereby holding the conical inlet member against displacement relative to the panels E or F with which it is associated. The angles of these hooks can be such as to maintain the inlet members pressed against the end panels.

Obviously with the trap constructed as described, it can be shipped in a substantially flat condition completely knocked-down. When it is desired to use it, the parts can be set up for use as already explained and the inlet members assembled between the panels of the trap and against the end panels. The trap is then ready for use and whenever it is desired to gain access to the interior thereof, it is merely necessary to disengage the top panel D from the adjacent rods 10' so that the panel can be swung upwardly as shown, for example, in Figure 3.

What is claimed is:

A knock-down trap including bottom, side, top and end panels hingedly connected, each of said end panels having an opening surrounded by a metal ring, providing entrance openings to the interior of the trap, a frusto-conical inlet member supported between the panels and extending inwardly from each end panel, each frusto-conical member embodying a length of yieldable sheet metal material providing an open frame covered with foraminous material and adapted to be bent into frusto-conical shape, one end of each frusto-conical inlet member resting against the metal ring of the end panel with which it is associated, surrounding the opening in the end panel, and hooks connected to the frusto-conical members, said hooks being extended towards the opening of the end panel associated therewith, and being hooked through the mesh of the side panels for removably securing the frusto-conical inlet members within the trap.

LOUIS E. STELLY.

REFERENCES CITED

The following references are of record in the file of this patent:

UNITED STATES PATENTS

| Number | Name | Date |
|---|---|---|
| 599,086 | Wisner | Feb. 15, 1898 |
| 726,140 | Campbell | Apr. 21, 1903 |
| 768,267 | Cassels | Aug. 23, 1904 |
| 836,248 | Ferguson | Nov. 20, 1906 |
| 872,556 | Carwile | Dec. 3, 1907 |
| 980,266 | Hubenbecker | Jan. 3, 1911 |
| 985,949 | Smith | Mar. 7, 1911 |
| 1,134,428 | Umstatter | Apr. 6, 1915 |